United States Patent
Meau et al.

(10) Patent No.: US 10,313,200 B2
(45) Date of Patent: Jun. 4, 2019

(54) UNIX FILE AND PROCESS MAPPING

(71) Applicant: BDNA Corporation, Mountain View, CA (US)

(72) Inventors: Alexander Meau, Mountain View, CA (US); Prashant Kumar Nagpal, Mountain View, CA (US)

(73) Assignee: BDNA Corporation, Mountain View, CA (US)

( * ) Notice: Subject to any disclaimer, the term of this patent is extended or adjusted under 35 U.S.C. 154(b) by 0 days.

(21) Appl. No.: 15/706,526

(22) Filed: Sep. 15, 2017

(65) Prior Publication Data

US 2019/0089596 A1    Mar. 21, 2019

(51) Int. Cl.

| G06F 19/00 | (2018.01) |
|---|---|
| H04L 12/24 | (2006.01) |
| H04W 8/00 | (2009.01) |
| G06F 17/30 | (2006.01) |
| H04L 29/08 | (2006.01) |
| G06F 16/10 | (2019.01) |

(52) U.S. Cl.
CPC ............. *H04L 41/12* (2013.01); *H04W 8/005* (2013.01); *G06F 16/10* (2019.01); *G06F 17/30067* (2013.01); *H04L 67/10* (2013.01)

(58) Field of Classification Search
CPC ...................................................... H04L 41/12
USPC ................................................ 717/114–123
See application file for complete search history.

(56) References Cited

U.S. PATENT DOCUMENTS

| 5,805,819 | A  | 9/1998  | Chin et al. |
| 5,887,140 | A  | 3/1999  | Itsumi et al. |
| 6,189,032 | B1 | 2/2001  | Susaki et al. |
| 6,336,138 | B1 | 1/2002  | Caswell et al. |
| 6,347,336 | B1 | 2/2002  | Song et al. |
| 6,487,659 | B1 | 11/2002 | Kigo et al. |
| 6,574,662 | B2 | 6/2003  | Sugiyama et al. |
| 6,633,834 | B2 | 10/2003 | Conrad et al. |
| 6,636,973 | B1 | 10/2003 | Novoa et al. |
| 6,834,304 | B1 | 12/2004 | Nisbet et al. |

(Continued)

FOREIGN PATENT DOCUMENTS

WO    WO 2018/191294    10/2018

OTHER PUBLICATIONS

Kim, Gene H., and Eugene H. Spafford. "The design and implementation of tripwire: A file system integrity checker." Proceedings of the 2nd ACM Conference on Computer and Communications Security. ACM, 1994.pp. 18-29 (Year: 1994).*

(Continued)

*Primary Examiner* — Satish Rampuria
(74) *Attorney, Agent, or Firm* — Knobbe, Martens, Olson & Bear, LLP (57) ABSTRACT

Each known operating system, software, or hardware within a UNIX environment can correspond to a list of identifiable attributes that is used to uniquely identify the operating system, software, or hardware of interest. By using these identifiable attributes in rules, fingerprints can be generated that define the existence of an object (e.g. operating systems, software and hardware) within the UNIX environment. By using the generated fingerprints via a discovery tool, the existence of the objects can be determined within the UNIX environment (e.g. computing device, computing network).

12 Claims, 5 Drawing Sheets

(56) References Cited

U.S. PATENT DOCUMENTS

| | | | |
|---|---|---|---|
| 6,845,393 B1 | 1/2005 | Murphy et al. | |
| 6,871,230 B1 | 3/2005 | Fukunaga et al. | |
| 6,920,492 B2 | 7/2005 | Richard | |
| 6,988,134 B2 | 1/2006 | Thorpe et al. | |
| 7,089,306 B2 | 8/2006 | Thorpe | |
| 7,493,388 B2 | 2/2009 | Wen et al. | |
| 7,720,950 B2 | 5/2010 | Joanovic et al. | |
| 8,051,298 B1 | 11/2011 | Burr et al. | |
| 8,874,621 B1* | 10/2014 | Goodwin | G06F 17/30292 707/756 |
| 8,924,302 B2* | 12/2014 | Bisbee | H04L 9/321 705/50 |
| 2003/0014332 A1 | 1/2003 | Gramling | |
| 2003/0055749 A1 | 3/2003 | Carmody et al. | |
| 2003/0101108 A1 | 5/2003 | Botham et al. | |
| 2003/0154199 A1 | 8/2003 | Thomas et al. | |
| 2003/0200294 A1 | 10/2003 | Thorpe et al. | |
| 2003/0200304 A1* | 10/2003 | Thorpe | G06Q 10/10 709/224 |
| 2004/0024662 A1 | 2/2004 | Gray et al. | |
| 2004/0122931 A1 | 6/2004 | Rowland et al. | |
| 2005/0033833 A1 | 2/2005 | Baldiga et al. | |
| 2005/0256973 A1 | 11/2005 | Holtz et al. | |
| 2006/0059262 A1 | 3/2006 | Adkinson et al. | |
| 2006/0129415 A1 | 6/2006 | Thukral | |
| 2006/0248187 A1 | 11/2006 | Thorpe | |
| 2007/0190609 A1 | 8/2007 | Black et al. | |
| 2008/0172583 A1* | 7/2008 | Mahajan | G06F 11/3672 714/57 |
| 2011/0218920 A1* | 9/2011 | Agrawal | G06Q 30/0283 705/50 |
| 2018/0075560 A1 | 3/2018 | Thukral | |
| 2018/0075561 A1 | 3/2018 | Thukral | |
| 2018/0295494 A1 | 10/2018 | Meau | |

OTHER PUBLICATIONS

Gupta, Sanchika, et al. "A fingerprinting system calls approach for intrusion detection in a cloud environment." Computational aspects of social networks (CASoN), 2012 fourth international conference on. IEEE, 2012.pp. 309-314 (Year: 2012).*

Mohammadzadeh, Hamid, Masood Mansoori, and Ian Welch. "Evaluation of fingerprinting techniques and a windows-based dynamic honeypot." Proceedings of the Eleventh Australasian Information Security Conference—vol. 138. Australian Computer Society, Inc., 2013.pp. 59-66 (Year: 2013).*

U.S. Appl. No. 11/011,890 Office Action dated Feb. 22, 2018.
U.S. Appl. No. 10/125,998 Office Action dated Jun. 29, 2005.
U.S. Appl. No. 11/416,654 Final Office Action dated Jan. 25, 2018.
U.S. Appl. No. 11/416,654 Office Action dated May 26, 2017.
U.S. Appl. No. 11/416,654 Final Office Action dated Apr. 20, 2017.
U.S. Appl. No. 11/416,654 Office Action dated Dec. 23, 2009.
PCT Application No. PCT/US2018/026947 International Search Report and Written Opinion dated Jun. 28, 2018.
U.S. Appl. No. 15/811,059, filed Nov. 13, 2017, Rohit Thukral, System for Linking Financial Asset Records With Networked Assets.
U.S. Appl. No. 15/811,338, filed Nov. 13, 2017, Rohit Thukral, System for Linking Financial Asset Records With Networked Assets.
U.S. Appl. No. 15/706,464, filed Sep. 15, 2017, Alexander Meau, Classification of Objects.
PCT/US18/26947, Classification of Objects, Apr. 10, 2018.
PCT/US18/51386, Unix File and Process Mapping, Sep. 17, 2018.
PCT Application No. PCT/US2018/051386 International Search Report and Written Opinion dated Nov. 14, 2018.
U.S. Appl. No. 11/011,890 Final Office Action dated Sep. 6, 2018.

* cited by examiner

| File Patterns from Discover Source Code | | Technopedia Mapping | |
| --- | --- | --- | --- |
| Signature File Pattern | App_ID | Manuf | Software |
| /bin/sqlplus | bdna.sw.Oracle.UNIXOracleInstallation | Oracle | Database Server |
| /bin/lsnrctl | bdna.sw.Oracle.UNIXOracleInstallation | Oracle | Database Server |
| /bin/acroread | bdna.sw.Adobe.UNIXAdobeReader | Adobe | Acrobat Reader |
| /bin/bpadm | bdna.sw.vertias.NetBackup_and_Client | Vertias | NetBackup Server |
| /bin/bpjobd | bdna.sw.vertias.NetBackup_and_Client | Veritas | NetBackup Server |
| /bin/bpinst | bdna.sw.vertias.NetBackup_and_Client | Vertias | NetBackup Server |
| /bin/bpsched.d | bdna.sw.vertias.NetBackup_and_Client | Veritas | NetBackup Server |
| /sbin/ibmdiradm | bdna.sw.IBM.UNIX_DirectoryServer | IBM | Directory Server |
| /sbin/idsslapd | bdna.sw.IBM.UNIX_DirectoryServer | IBM | Directory Server |
| /bin/ibmdirctl | bdna.sw.IBM.UNIX_DirectoryServer | IBM | Directory Server |

UNIX FILE AND PROCESS MAPPING

BACKGROUND

Field of Invention

The present invention generally relates to classifying objects. More specifically, the present invention relates to File and Process Mapping of objects that may be found on computing devices associated with a UNIX-based environment.

Description of the Related Art

Different applications (e.g. software) can be installed on different computing devices on a computing network. Companies may have in their inventory many computing devices all connected to a shared computing network. These computing devices may not be located within the same physical location. As such, there are challenges in identifying, locating, and managing the applications the company may have. There may be applications that are licensed from third parties that would require the company to evaluate, for example, how many licenses are currently owned and whether more or less licenses are currently needed. In this way, a company can determine how much money would be needed to pay for a particular application that the company may need to use.

Presently, the location, identification, and management of on computing devices can be performed manually. For example, an administrator may need to access a computing device in question and compile the applications that are currently associated with that computing device. Alternatively, an agent may be installed on each computing device that allows for the administrator to remotely monitor the applications on each computing device. However, with each of these two present processes, as a computing network increases in size, the ability to manually check or monitor via installed agents will become resource intensive and thus not scalable. Furthermore, this process requires that the administrator has knowledge that the computing device exists (e.g. device identification) on the computing network and thus can connect with that computing device.

Therefore, there is a need for an improved process that facilitates the identification and location of any and all computing devices currently connected to the computing network. Once each computing device has been identified, the process can subsequently identify and locate the applications that each computing device has. In a further situation, there is also a need to characterize new applications that may also be found on applicable computing devices within the computing networks.

Additionally, methods for identifying applications associated with UNIX-based computing devices are different than those computing devices running more the more common Windows-based operating systems. Computing devices running Windows operating systems associate file extensions with the executable files used to execute the application. By locating and identifying the file extensions and executable files, the various different applications can be identified on Windows-based operating system computing devices.

However, UNIX-based computing devices do not associate file extensions with associated executable files. Instead, UNIX utilizes software tools that consist of small programs (or processes) that are strung together using a command-line interpreter rather than having a single monolithic program that may include all the same functionality. Therefore, there is a need to implement a method for identifying and locating applications in a UNIX environment.

SUMMARY OF THE CLAIMED INVENTION

A method for generating fingerprints for a UNIX-based environment is presently claimed. The method first receives a plurality of identifiable attributes associated with an object. Each object has its own unique combination of identifiable attributes corresponding to processes used in connection with the object within the UNIX environment. Based on the unique combination of attributes, rules are specifically generated for the purpose of identifying that object within the UNIX environment. These rules can then be used within a script so that an application using the script can search for and identify whether the object exists within the UNIX-based environment.

A system for generating fingerprints for a UNIX-based environment is presently claimed. The system includes one or more computing devices associated with the UNIX-based environment. The system also includes a server that includes memory that has instructions that are executed by a processor to perform the steps for generating fingerprints. First, the server receives a plurality of identifiable attributes associated with an object. Each object has its own unique combination of identifiable attributes corresponding to processes used in connection with the object within the UNIX environment. Based on the unique combination of attributes, rules are specifically generated for the purpose of identifying that object within the UNIX environment. These rules can then be used within a script so that an application using the script can search for and identify whether the object exists within the UNIX-based environment.

A non-transitory computer-readable storage medium that has a program that is executable by a processor to perform a method for generating fingerprints for a UNIX-based environment is presently claimed. The method first receives a plurality of identifiable attributes associated with an object. Each object has its own unique combination of identifiable attributes corresponding to processes used in connection with the object within the UNIX environment. Based on the unique combination of attributes, rules are specifically generated for the purpose of identifying that object within the UNIX environment. These rules can then be used within a script so that an application using the script can search for and identify whether the object exists within the UNIX-based environment.

DETAILED DESCRIPTION

Fingerprints are used to identify different objects within an unknown environment such as a computing device or within computing network. Fingerprints correspond to a list of identifiable attributes that can be used to uniquely identify an object (e.g. hardware, software, operating system, computing device). With the list of attributes, the fingerprints can be used, for example, to identify what computing devices are associated with a computing network, what operating system is being run on each computing device, and what software and hardware is installed on each computing device.

As used herein, objects refer to different features that can be characterized within the unknown environment. Example objects, referenced in the various embodiments within the detailed description, include computing devices that can be found in a computing network, operating systems run on the computing devices, and each software and hardware that is installed on the computing devices.

By using the identifiable attributes in rules, scripts can be generated from the rules to define the existence of corresponding software, hardware, operating systems, or computing devices of interest to be associated with a respective fingerprint. With the fingerprints, the corresponding software, hardware, operating system, or computing device can be searched for on a computing network.

The fingerprints used to define, for example, software may generally define all versions of that software. However, in situations where differences between versions are substantial in nature (e.g. where new or different attributes are used to define the newer version of the software), new rules may be needed to identify and define different versions.

There may also be different fingerprints for the same software, hardware, operating system or computing device of interest based on a level of credential or authorization associated with the computing device or the computing network that will be searched using the fingerprints. In different embodiments, the same fingerprint can be used to define software, hardware, operating systems, or computing devices using information of different credential levels. As described below, access to the computing device or computing network can be provided at different degrees that would allow for the retrieval of different types of identifiable attributes usable to classify or search for software, hardware, operating system, or computing device of interest on a computing device or computing network. For example, such authorization may include 1) network-based credentials that allows for classification and identification of computing devices within the computing network, 2) operating system-based credentials that allows for classification and identification of operating systems of the identified computing devices within the computing network, and 3) application-based credentials that allows for the classification and identification of software and hardware installed on each computing device within the computing network.

As an example, with the use of network-based credentials, the information used for the fingerprint may only be based on the scanning of the overall computing network for information about the computing devices of interest within the computing network. With other types of credentials (such as those credentials associated with an operating system or particular application), additional information can be obtained directly from a particular computing device. Such additional information corresponds to the credential provided. The different types of credentials (i.e. authorization for access to the network, computing device or application) can provide different detailed information for the corresponding fingerprints used to identify software, hardware, operating system, or computing device of interest.

The different level of credentials may affect the type of rules (and in turn the fingerprints) that are generated. The different level of credentials may also affect how a customer would be able to search for software, hardware, operating system, or computing device of interest. In this way, rules may be generated for each credential level possible with each type of software, hardware, operating system, or computing device of interest since different customers may have different credential levels.

As described above, the list of identifiable attributes are associated with rules used to identify different software, hardware, operating system, or computing device of interest. These rules are formatted into a script that would be compatible with and would be run on an associated application (e.g. discovery tool) that would search for and identify whether software, hardware, operating system, or computing device of interest is found on a computing network.

In searching for a particular object within a computing network or computing device, the script (associated with a fingerprint) is run on a discovery tool. The discovery tool uses the script to, for example, look into the memory associated with the computing network or computer device. The search may be directed towards a specific file name, a particular registry in memory and/or particular file path. Based on information retrieved from those locations, the discovery tool can confirm what software is currently stored in the computing device based on the matching.

The present application applies the concept of fingerprints with a UNIX-based environment. UNIX is a computer operating system that uses a modular design. This means that the operating system uses sets of simple tools that each performs a limited, well-defined function. A unified filesystem is used as the main means of communication while shell scripting and command language is used to combine the tools in order to perform complex workflows associated with an application. So instead of a single application being stored and run on the computing device, an application associated with the UNIX-based environment would need to be installed onto the computing device through the use of packages that provides the applicable tools for implementing the application of interest by the operating system.

Because the applications within the UNIX-based environment are not defined as a single monolithic program when stored and executed in computing devices compared to other known operating systems (e.g. WINDOWS), UNIX-based operating systems are not capable of providing a set list of objects (e.g. applications) that can be referenced to identify what objects are currently associated with that computing device. So finding what objects (e.g. applications) are currently installed on a UNIX-based computing device may not be straight forward as searching and matching objects from the set list.

Applications within UNIX-based operating systems can still be discovered, mapped, and compiled into a fingerprint database. In particular, UNIX-based fingerprints that are used to identify if a particular object is found on the computing device are generated by identifying file names and related installation paths for the tools associated with the applications on the computing device. For example, some applications may have two or more key file patterns that can be used to uniquely identify the tools associated with a particular application is currently installed on the computing device. By having more key file patterns, the fingerprint database can reduce false positive identifications. Further details regarding how the UNIX-based fingerprints are generated are provided below.

Figure 1:
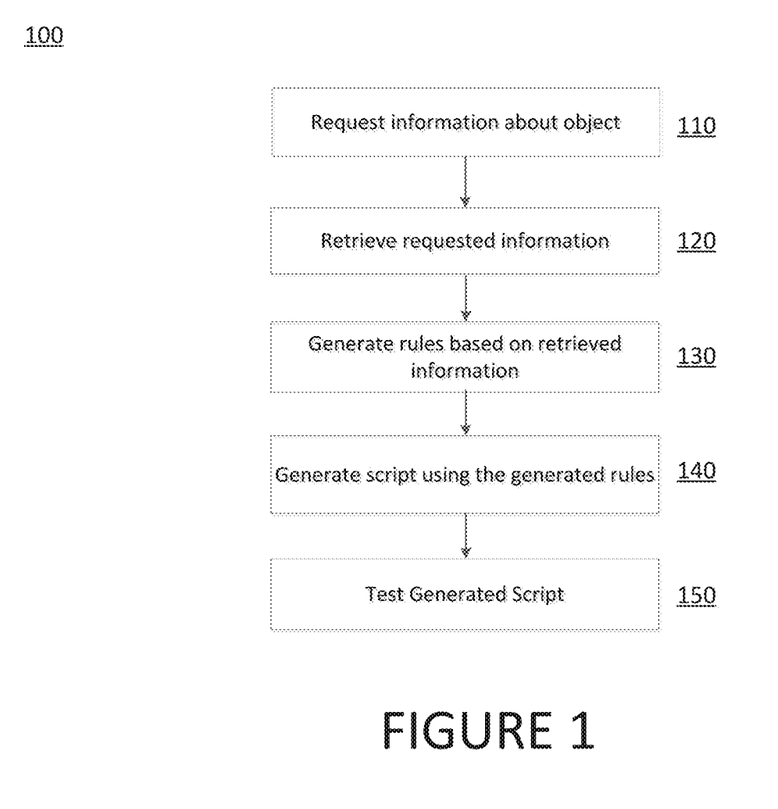
FIG. 1 illustrates a method for generating fingerprints.

FIG. 1 illustrates a method 100 for generating fingerprints. As described above, fingerprints are used to identify different objects that may be found, for example, on a computing network. Such objects may include computing devices associated with the computing network, the operating system of each computing device, and the software and hardware installed on each computing device. It should be noted that different fingerprints can be generated using a number of different methods described below in the various embodiments. These different methods correspond to a level of access that the method has with the customer's computing device in order to obtain information needed to characterize the object.

In a first step 110, information about the object (e.g. software, hardware, operating system, computing device of interest) is requested from the customer. The information about the object can be obtained using different methods based on the access credentials the customer is able to provide with respect to the computing network or computing device. In a first scenario, information about the object can be obtained directly from the customer. In particular, the customer has access to the object via the computing network or computing device but is unable (or unwilling) to provide others access to the object via the computing network or computing device in order to allow for the characterization of the object. For this scenario, a questionnaire can be provided to the customer that provides different requests for information associated with identifiable attributes used to characterize and uniquely identify the object associated with the computing network or computing device. The requested information may include identifiable attribute information such as what is stored in memory at a particular location or whether a particular file exists at a pre-determined location within the computing device.

By using the questionnaire, the customer can retrieve the requested information 120 that will be used to characterize the object. For example, the customer performed search may provide information that can be used to uniquely characterize the presence of the object associated with the computing network or computing device. Such information may include information such as particular process listings, file listings, application folder paths, package listings, and readme and log files stored in the computing device.

In a second scenario, a proprietary agent may be used to obtain information associated with the generation of fingerprints directly from the computing network or computing device associated with an object in question 110. The proprietary agent may be appropriate when the customer provides an operating system or application-based credential that allows permission for such proprietary agent to be installed or run on the computing network or computing device. The proprietary agent would include a collection of commands (or scripts) that may be run to search for and collect particular information contained within the computing network or computing device about a wide number of different possible objects that may be found. All this information will subsequently be used to 1) uniquely identify the object, and 2) generate corresponding fingerprints for the object found on the computing network or computing device.

As described above, the proprietary agent may be installed on the computing device that contains the object(s) to be characterized. Alternatively, the proprietary agent may be run within the computing network (e.g. via a computing device or virtual machine operating within the computing network). Using the proprietary agent, information that would include the identifiable attributes used to characterize the object of interest would be retrieved 120. The retrieval would be based on the commands/scripts that are associated with the proprietary agent. A proprietary server would later receive the information from the proprietary agent and output a summary associated with the information obtained about the characterized object(s) found on the computing network or computing device corresponding to the identifiable attributes that uniquely identify those objects that were retrieved.

The types of information retrieved via the proprietary agent may be different from (and include more detailed information) compared to the types of information obtainable from the customer via the surveys. For example, the proprietary agent may be capable of retrieving information from specific locations within the hard drive of the computing device (e.g. memory locations, processes, threads) where a customer may not normally have easy access to. Furthermore, the proprietary agent also provides for an automated means of obtaining the information associated with the identifiable attributes.

Using the information regarding the identifiable attributes associated with the characterized object provided by the customer or the proprietary agent, rules can be generated 130 that can subsequently be used to search for those identifiable attributes in other computing networks or computing devices. For example, if software A stored on a computing device always has a file name "file A" in memory location A of the computing device, a rule can be generated that looks for the location of "file A" on other computing devices to determine if software A is found on these other computing devices. Based on the output of the rule, an outcome of whether software A is found on the other computing device can be obtained. For each object, there may be a combination of many different identifiable attributes that would be used to uniquely identify the object. The combination of these generated rules would form the script used to collect the information used to uniquely identify the object 140 within the computing device or computing network. This information is used to generate the fingerprint that can identify the object within computing devices or computing networks.

Once the fingerprint is generated, the generated fingerprint is tested 150 to confirm whether it operates properly based on the information retrieved about the object 120 from the computing network or computing device. For example, by running the discovery tool with the newly generated fingerprint on the previously examined computing device or computing network, one would presume that the particular object (e.g. software or hardware) would be properly identified. However, if different results occur (e.g. the wrong software/hardware was identified, no software/hardware was identified), then this can be indicative that further review of the characteristics and rules associated with the script may be needed. In particular, the characteristics used to identify the software or hardware on the computing device may be incorrect or more characteristics may be needed to uniquely identify the software or hardware from other software or hardware that may have similar characteristics also associated with the computing device or computing network.

It is described above that the generation of fingerprints for various objects (with the use of the proprietary agent and the proprietary server) and the use of the fingerprints to search for objects (via the discovery tool) are performed by distinct processes. However, in other embodiments, these functions may be performed by a single application.

Furthermore, the tests performed in step 150 can also address situations where "false positives" and/or "false negatives" can occur. False positives may arise where a combination of rules using the identifiable attributes may actually refer to more than one object (e.g. software). In this way, different objects that may not exist in the computing device or computing network may be returned erroneously to the user. In this situation, additional identifiable attributes may be needed in order to further uniquely identify and distinguish between similar objects so that only the appropriate object is returned. In contrast, "false negatives" occur where the fingerprint being used is not returning anything back to the user (i.e. the object is not recognized despite being present on the computing device or computing network). In this case, the generated fingerprint may be erroneous (such as relying on the wrong characteristics to identify the object) so further tests may be needed (via step 150) in order to ensure that the generated fingerprint is appropriate for the object that is stored on the computing device or computing network.

Once a fingerprint has been validated as working properly via step 150, the fingerprint can be stored in a fingerprint database. The fingerprint database can be organized based on various different criteria such as name, manufacturer, type, version, and date generated.

The generated fingerprints can also be stored into organized packages. For example, these organized packages may contain other fingerprints generated during the same predetermined time period (e.g. month) and based on other similar attributes (e.g. type, manufacturer, operating system). These fingerprint packages are available to the customer for their respective uses (described in further detail below) with identifying objects associated with the package of fingerprints using the discovery tool. Older packages associated with previous time periods can be subsequently stored in a database or repository once a new package is generated during a next pre-determined time period.

As described above, updates to an object (e.g. software) corresponding to different versions of the same object for which a fingerprint is already generated and stored in a database/package may be covered by existing fingerprints. This is because the different version may still share the same identifiable attributes used to characterize the object despite being a different version. However, in situations where the newer version of the object has one or more identifiable attributes that are new or significantly different from a previous version, new fingerprints may be needed in order to properly identify the newer versions of the object.

Embodiments of the present application may also include situations where both a questionnaire and proprietary agent is used for identifying attributes used to characterize the object. By combining these two methods, greater amounts of information may be available to characterize the object to be incorporated into the generated fingerprint.

Figure 2:
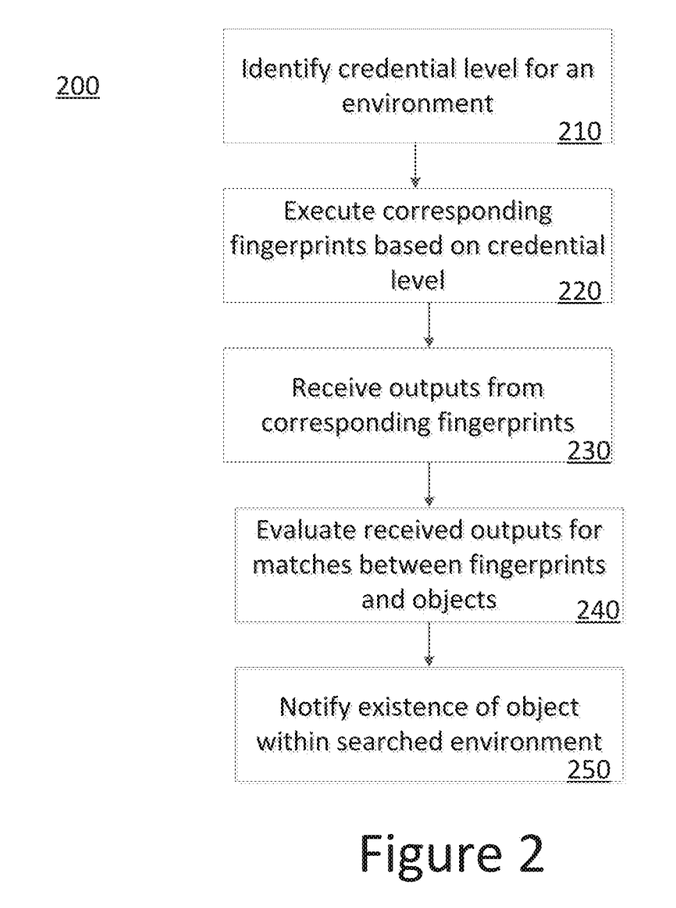
FIG. 2 illustrates a method for locating objects using the generated fingerprints.

FIG. 2 illustrates a method 200 for locating objects using the generated fingerprints. With respect to the discovery tool used to search for a particular object associated with an environment (e.g. computing network), the discovery tool itself may include numerous scripts associated with many possible different objects. The discovery tool may also include different versions of scripts used to identify different versions of the objects based on the credential level that the customer currently has with respect to the environment. The discovery tool may access the fingerprint database to use the various available fingerprints used to detect objects within the environment. In some embodiments, this may require that the discovery tool download sets of fingerprints to use (via a package from the fingerprint database). Alternatively, the discovery tool may be capable of accessing the fingerprint database and using the full set of fingerprints stored within the fingerprint database.

For the packaged set of fingerprints, a customer may generally know what objects would need to be searched (e.g. software that may be installed on the computing device or computing network associated with a particular operating system). In this case, the fingerprint package provided to the discovery tool may solely include the known objects.

In step 210, the customer would need to identify a credential (or authorization) level associated with what type of authorized access the customer would have to an environment being searched such as a computing device or computing network. Based on the credential level, the corresponding fingerprints used to search for objects will be executed by the discovery tool in step 220. As noted above, there may be different fingerprints used in searching for the same object. The different fingerprints arise based on the credential level that identifies what types of information (e.g. identifiable attributes) that would be used to characterize the object. In another embodiment, the same fingerprint for an object may one script that can be used to search for and return different types of information based on the credential level.

In step 230, information associated with the executed fingerprint is obtained. The output may correspond to information associated with the identifiable attributes (e.g. values, memory locations, status) used to identify whether an object is found within the environment (e.g. computing device or computing network). The obtained information is then provided to a proprietary server that would be used to process the collected data. In some cases, the proprietary server may be part of the fingerprint database.

In step 240, the received outputs are evaluated in order to determine if any matches can be identified. The evaluation is performed on the proprietary server so as to minimize the processing required to be performed at the customer's computing network or computing device. In some embodiments, it may be possible to perform such evaluation (via the proprietary agent) so long as the processing resources needed to identify the objects are kept to a minimum (e.g. only looking for a particular piece of software).

In step 250, the evaluation provides matches between the information obtained from the computing device or computing network and the fingerprints associated with the fingerprint database. Any matching fingerprints, signifying that the corresponding object is found on the computing network or computing device that was search, may be provided to the customer. In situations where no matches are found with respect to the executed fingerprints, notification to the customer can also be provided to indicate that none of the searched objects were found in the environment.

Figure 4:
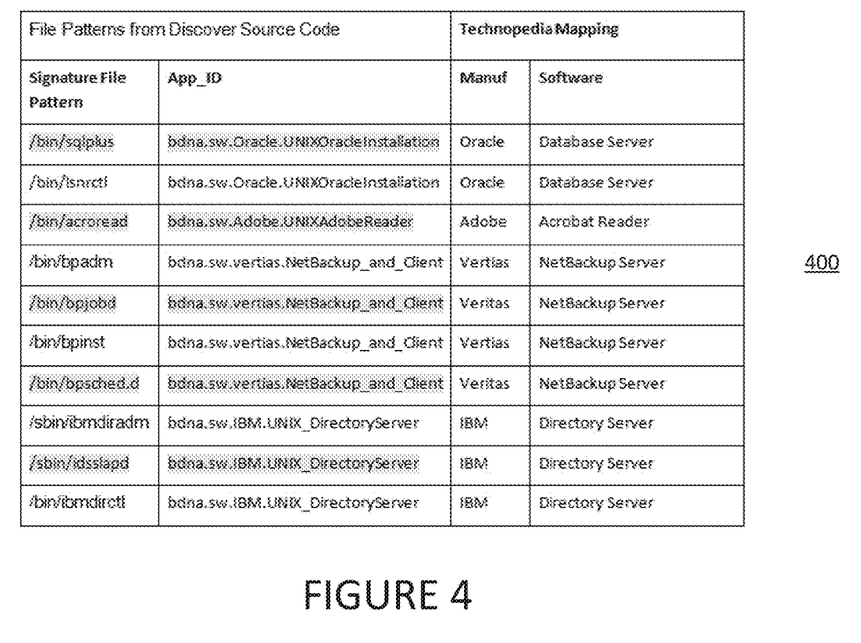
FIG. 4 illustrate example file patterns.

It may be possible that when multiple computing devices are searched simultaneously (or within a period of time) in a computing network using the discovery tool, the information provided to the customer can include how many matches were identified and the location or identity of the computing devices with the identified object. Example file patterns that can be used to identify applications on the computing devices or computing networks are provided below with reference to FIG. 4A.

Figure 3:
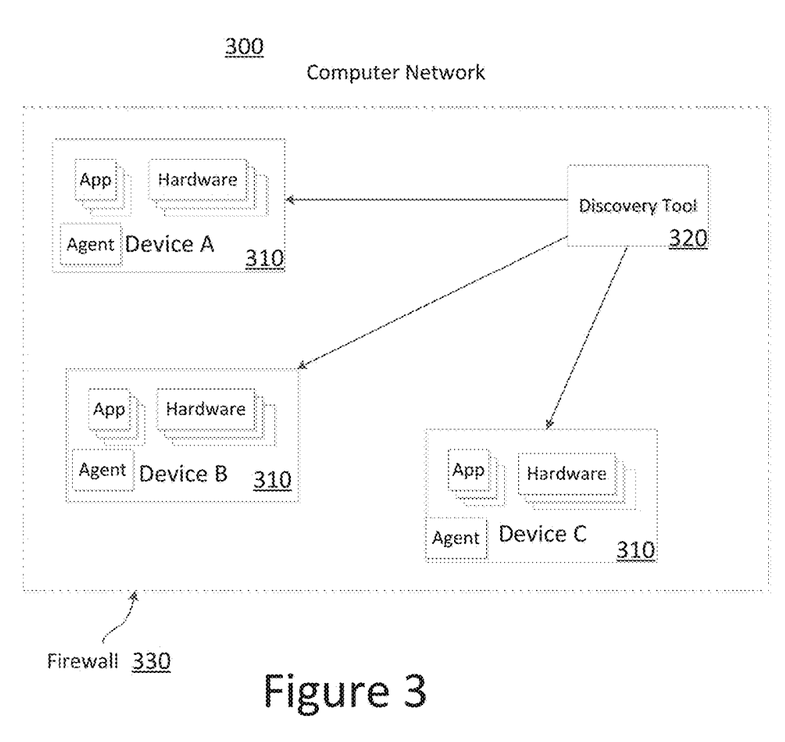
FIG. 3 illustrates how fingerprints can be used to identify various objects within the environment.

FIG. 3 illustrates how fingerprints can be used to identify various objects within the environment. The environment being searched using fingerprints can be a single computing device or may include a plurality of computing devices within a computing network. As illustrated in FIG. 3, a computing network 300 is provided that could be subject to searches using generated fingerprints.

As noted above, fingerprints are used to identify objects within an environment such as hardware, software, operating systems, and computing devices. For example, a fingerprint could be used with respect to a computing network 300 in order to locate all available computing devices 310 within the computing network 300. Furthermore, once each computing device 310 within the computing network 300 has been located, another set of fingerprints can be used to identify corresponding operating systems (e.g. WINDOWS, LINUX) run on each of the computing devices. The identification of the operating system (e.g. WINDOWS, LINUX) associated with a computing device 310 would be used to select a subset of fingerprints associated with hardware and/or software compatible with that operating system that may potentially be found on that computing device 310. Lastly, a third set of compatible fingerprints would be used with each computing device 310 in order to identify what software and/or hardware may be found on the computing device 310.

As described above, searches of the computing network 300 can be performed with the use of proprietary agents. In this agent-based methodology, the proprietary agent would need to be installed on each computing device within the computing network so that information regarding objects can be provided back to the discovery tool 320. There are disadvantages to this method because of the scalability issues as the computing network grows. For example, as the computing network expands, the number of proprietary agents that would need to be installed and monitored would increase (thereby increasing the resources needed within the overall system). Furthermore, the proprietary agents would only be capable of being installed on known computing devices. Any unknown computing devices associated with the computing network would be missed.

In another embodiment, it may be possible to also perform agentless searches of the computing network which may get around the scalability issues raised above. For example, the discovery tool 320 can be run on a virtual machine within the computing network 300. In this way, the discovery tool 320 would not need to be directly installed on any of the computing devices 310 associated with the computing network 300 but still be capable of seeking out and communicating with the computing devices 310 within the computing network 300. Since there may be situations where the customer may be unaware of what computing devices 310 are actually associated with the computing network 300, by not requiring that the discovery tool 320 be installed on each computing device 310, this allows for the customer (via the discovery tool 320) to discover previously unknown computing devices 310 associated with the computing network 300.

With the agentless method of discovering objects, the searches performed by the discovery tool 320 may be restricted to a particular computing network 300 such as one that is encompassed by a firewall 330. Such a restriction would limit the search performed by the discovery tool 320 to only relevant objects within the computing network 300 of interest since there may also exist discoverable objects outside of the computing network 300 as well. However, the customer may only be interested in discovering objects within the environment (e.g. computing network 300 or computing device 310) of interest.

Discovery of a computing device may include any direct communication between the discovery tool 320 and the computing devices 310 within the computing network 300. Furthermore, the discovery tool 320 may also be capable of detecting computing devices outside of the firewall 330 but which are connected to the computing network 300 via virtual private network (VPN) (not shown).

Additionally, discovery using the discovery tool 320 could also allow customers to catalog objects within the computing network. For example, the discovery tool 320 would allow the customer to obtain information such as the operating system, software and/or hardware that may be installed on each computing device 310 associated with the computing network 300.

FIG. 4 illustrate example file patterns 400. These file patterns 400 are example mappings of processes run on the UNIX-based operating system that uniquely identify the presence of a corresponding software application. As described above, UNIX executes various processes that collectively are used to perform the functions of the software application. The example file patterns 400 provide the names of the processes that are used to characterize what processes are typically associated with each software application. Information about the corresponding software application is also provided and mapped with the associated file patterns. When locating one of the listed processes within the example file pattern 400, if one of the patterns is found in the hard drive of the computing device, this would infer that the corresponding software application is stored on the same computing device.

In an initial search of an unknown computing network (such as the one illustrated in FIG. 3) using fingerprints, the customer may not completely know what computing devices are associated with the computing network. For example, the customer may wish to conduct an inventory of all computing devices associated with its company computing network. The customer may know what desktops are currently connected to the computing network at a given location but may be uncertain what mobile devices (e.g. smartphones, laptops) are also currently connected to the computing network as such mobile devices may not be physically present at the same location. For example, such mobile devices may be connected to the computing network remotely through a virtual private network (VPN). The initial search may detect any activity or information that could correspond to a computing device (known or unknown by the customer) that is currently connected to the computing network. As noted above, detection of computing devices in the computing network may be restricted to only computing devices located within the firewall encompassing the customer computing network.

Any detected computing devices during this initial scan (i.e. level one search) will be provided to the user via the user interface. Based on how the computing device was detected by the discovery tool, the location of the computing device on the computing network can be provided via an IP address or VPN address.

Once the different computing devices associated with the computing network have been located, the discovery tool can then begin identifying what operating system is run on each computing device (i.e. level two search). With this step, fingerprints of the operating systems are used by the discovery tool to identify characteristics that correspond to a particular operating system (e.g. WINDOWS, LINUX, UNIX). Such characteristics used to identify a particular operating system may include viewing how the IP address is listed, what ports are being used by the computer device, what files are being run on the computer device, the headers associated with the information being transmitted from the computing device, and response times for activity run on the computing device. Each operating system (as well as versions of the same type of operating system) will have a unique fingerprint that corresponds to information associated with the above characteristics.

Once an operating system for a computing device has been identified, the corresponding information can be provided in the user interface. The information that is provided in the user interface can be obtained from an external database that houses descriptive information about the operating system. The descriptive information (e.g. manufacturer, type, family, edition, version) stored in the external database is matched with the fingerprint that is used to identify the operating system in the computing network.

Aside from providing information regarding what operating system is currently being run on the computing device, the identified operating system also filters all available fingerprints to a subset of fingerprints associated with possible hardware or software that can be installed and run (i.e. compatible) on the computing device being searched. For example, if the identified operating system is WINDOWS, corresponding fingerprints associated with compatible versions of MICROSOFT OFFICE will be used to search the computing device as to whether the computing device has MICROSOFT OFFICE and what version of the software the computing device has installed. If the operating system is UNIX, however, different fingerprints corresponding to the search of different processes will be used instead.

For each computing device, an application user interface will provide a list of applicable software and/or hardware currently installed on the computing device. The list is generated based on matching fingerprints executed by the discovery tool for the computing device. Any matches between software and/or hardware installed on the computing device and fingerprints executed by the discovery tool will be outputted onto the user interface.

It may be possible, however, that the user interface does not illustrate all hardware and/or software currently installed on the computing device since only fingerprints that are currently be executed will result in an output to the user interface. If a fingerprint does not exist for a particular software or hardware on the computing device, the discovery tool will not be able to identify the existence of that unknown software or hardware. However the discovery tool (individually or in connection with the characterization application) can be used to collect additional information (e.g. information that was not connected to fingerprints searched via the discovery tool) available at the computing device so that new fingerprints may be generated and subsequently used to identify what other applications may be currently associated with the computing device.

For example, a fingerprint may be used to determine whether the computing device has MICROSOFT WORD installed on the computing device. Different fingerprints may be available to distinguish between different versions of MICROSOFT WORD. In some embodiments, the same fingerprint can be used to identify that the computing device has MICROSOFT OFFICE and subsequently identify the version that is currently installed on the computing device.

Once a match is found, the discovery tool can conclude that a particular version of MICROSOFT WORD is currently installed on the computing device. Any additional information (e.g. manufacturer, application type, version) can be retrieved from the external database that can be then provided to the application user interface for the customer to view.

The information provided in the user interface described above facilitates the ability for the customer to locate and catalog different objects in an environment (e.g. computing network). For example, the fingerprints and discovery tool would be useful in enforcing software compliance, cataloging, and asset management. With respect to software compliance, the generated fingerprints can be used to identify whether corresponding software is located with the corresponding computing device or computing network as illustrated in FIG. 3. Location of the software can then be used to determine if the appropriate license has been acquired for the use of the software.

Asset management and cataloguing is carried out through the use of generated fingerprints and the discovery tool. By searching known objects (e.g. computing device, operating system, hardware, software) within the environment (e.g. computing network) using corresponding fingerprints, the discovery tool is able to provide the location of the objects in a convenient manner. For example, the discovery tool may provide an output (such as a text-based readout) that identifies what software and hardware is currently stored on various computing devices in a computing network. Using this output, the customer can catalog what computing devices are associated with the computing network and track what objects (e.g. operating system, hardware, software) are associated with each particular computing device associated with the computing network.

Figure 5:
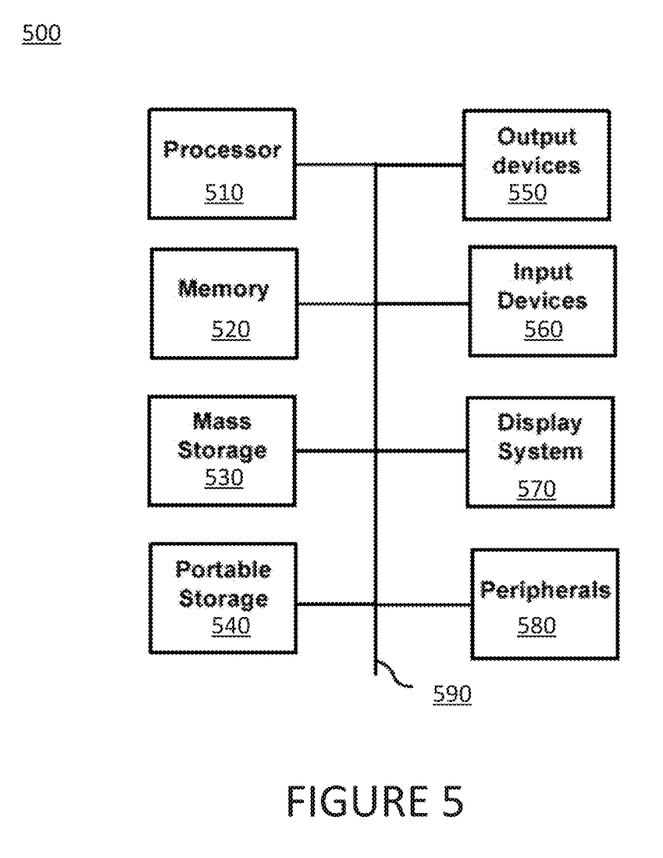
FIG. 5 illustrates an exemplary computing device that may be used to implement an embodiment of the present invention.

FIG. 5 illustrates an exemplary computing system 500 that may be used to implement an embodiment of the present invention. For example, the computing system 500 may be associated with the generation of the fingerprints. Furthermore, the computing system 500 may also be associated with the discovery tool used to identify different objects within an environment of interest.

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held user device, telephone, mobile user device, workstation, server, minicomputer, mainframe computer, or any other user device. The computer can also include different bus configurations, networked platforms, multi-processor platforms, etc. Various operating systems can be used including UNIX, LINUX, WINDOWS, MACINTOSH OS, PALM OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for generating UNIX-based fingerprints, the method comprising:
    identifying a credential level associated with a customer, wherein the identified credential level is associated with a degree of access that the customer has to a UNIX-based environment;
    retrieving a set of attributes associated with a UNIX-based object based on the degree of access associated with the identified credential level, wherein the retrieved set of attributes correspond to a unique set of processes of the UNIX-based object, and wherein a different set of attributes is retrieved for a different credential level associated with a different degree of access to the UNIX-based environment;
    generating rules for identifying the UNIX-based object at the identified credential level based on the set of retrieved attributes, wherein different rules for identifying the same UNIX-based object are generated for the different credential level based on the different set of attributes; and
    generating a script based on the generated rules and the different rules, wherein the generated script is executable by an application that is used to search for the same UNIX-based object within the UNIX-based environment in accordance with the identified credential level for the customer and at the different credential level.

2. The method of claim 1, wherein the UNIX-based environment is on a computing device.

3. The method of claim 2, wherein the UNIX-based object includes software, hardware, or an operating system associated with the computing device.

4. The method of claim 1, wherein the UNIX-based environment is in a computing network having a plurality of computing devices.

5. The method of claim 4, wherein the UNIX-based object is associated with two or more computing devices associated with the computing network.

6. The method of claim 1, wherein the received set of attributes is obtained from an agent executed on the computing device or computing network.

7. The method of claim 1, further comprising:
    executing the generated script via a discovery tool; and
    receiving an output from the discovery tool based on the executed script, wherein the received output indicates whether the UNIX-based object is found in the UNIX-based environment.

8. The method of claim 7, wherein the output is provided on a graphical user interface.

9. The method of claim 8, wherein the output provides information relevant to evaluate software compliance, cataloging, and asset management associated with UNIX-based objects found in the UNIX-based environment.

10. The method of claim 1, further comprising testing the generated script to conclude if the UNIX-based object is properly identified when used by the discovery tool.

11. A system for generating UNIX-based fingerprints, the system comprising:
    one or more computing devices associated with a UNIX-based environment; and
    a server that includes memory that has instructions executed by a processor to:
        identify a credential level associated with a customer, wherein the identified credential level is associated with a degree of access that the customer has to the UNIX-based environment
        retrieve a set of attributes associated with a UNIX-based object based on the degree of access associated with the identified credential level, wherein the retrieved set of attributes correspond to a unique set of processes of the UNIX-based object, and wherein a different set of attributes is retrieved for a different credential level associated with a different degree of access to the UNIX-based environment;
        generate rules for identifying the UNIX-based object at the identified credential level based on the set of retrieved attributes, wherein different rules for identifying the same UNIX-based object are generated for the different credential level based on the different set of attributes; and
        generate a script based on the generated rules and the different rules, wherein the generated script is executable by an application that is used to search for the same UNIX-based object within the UNIX-based environment in accordance with the identified credential level for the customer and at the different credential level.

12. A non-transitory computer-readable storage medium having embodied thereon a program, the program being executable by a processor to perform a method for generating UNIX-based fingerprints, the method comprising:
    identifying a credential level associated with a customer, wherein the identified credential level is associated with a degree of access that the customer has to a UNIX-based environment;
    retrieving a set of attributes associated with a UNIX-based object based on the degree of access associated with the identified credential level, wherein the retrieved set of attributes correspond to a unique set of processes of the UNIX-based object, and wherein a different set of attributes is retrieved for a different credential level associated with a different degree of access to the UNIX-based environment;

generating rules for identifying the UNIX-based object at the identified credential level based on the set of retrieved attributes, wherein different rules for identifying the same UNIX-based object are generated for the different credential level based on the different set of attributes; and generating a script based on the generated rules and the different rules, wherein the generated script is executable by an application that is used to search for the same UNIX-based object within the UNIX-based environment in accordance with the identified credential level for the customer and at the different credential level.

* * * * *